United States Patent
Ramorini et al.

(10) Patent No.: US 9,680,323 B2
(45) Date of Patent: Jun. 13, 2017

(54) SINGLE INDUCTOR DC-DC CONVERTER WITH REGULATED OUTPUT AND ENERGY HARVESTING SYSTEM

(71) Applicant: STMicroelectronics S.r.l., Agrate Brianza (IT)

(72) Inventors: Stefano Ramorini, Arluno (IT); Alessandro Gasparini, Cusano Milanino (IT); Alberto Cattani, Cislago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 156 days.

(21) Appl. No.: 14/505,029

(22) Filed: Oct. 2, 2014

(65) Prior Publication Data
US 2016/0099582 A1    Apr. 7, 2016

(51) Int. Cl.
| | |
|---|---|
| *H02J 7/00* | (2006.01) |
| *H02M 3/158* | (2006.01) |
| *H02M 1/00* | (2006.01) |
| *H02J 7/34* | (2006.01) |

(52) U.S. Cl.
CPC ............ *H02J 7/007* (2013.01); *H02J 7/0052* (2013.01); *H02M 3/158* (2013.01); *H02J 7/345* (2013.01); *H02J 2007/0059* (2013.01); *H02M 2001/009* (2013.01)

(58) Field of Classification Search
CPC .. H02J 7/007; H02J 7/0052; H02J 2007/0059; H02J 7/345; H02M 2001/009; H01M 3/158

USPC ........................................................ 320/162
See application file for complete search history.

(56) References Cited

U.S. PATENT DOCUMENTS

| | | | |
|---|---|---|---|
| 8,970,161 B1* | 3/2015 | Cuadros ................ | H02J 7/0068 320/101 |
| 2011/0298442 A1* | 12/2011 | Waltisperger ........ | H03K 17/122 323/299 |
| 2012/0274134 A1* | 11/2012 | Gasparini ........... | H02M 3/1584 307/31 |

(Continued)

OTHER PUBLICATIONS

Bandyopadhyay, Saurav et al: "Platform Architecture for Solar, Thermal, and Vibration Energy Combining With MPPT and Single Inductor," IEEE Journal of Solid-State Circuits, vol. 47, No. 9, Sep. 2012 (pp. 2199-2215).

(Continued)

*Primary Examiner* — Richard Isla Rodas
*Assistant Examiner* — Dung V Bui
(74) *Attorney, Agent, or Firm* — Gardere Wynne Sewell LLP (57) ABSTRACT

An energy harvesting circuit receives an input voltage from a transducer and uses a single inductor operating in a DC-DC converter charging mode to generate charging current at a first output coupled to an energy storage device where a supply voltage is stored. The energy harvesting circuit further receives the supply voltage from the energy storage device and uses the same single inductor operating in a DC-DC converter regulating mode to generate load current at a second output where a regulated load voltage is provided. The energy harvesting circuit switches between the charging mode and the regulating mode in accordance with a discontinuous mode (DCM) control process.

13 Claims, 12 Drawing Sheets

(56) References Cited

U.S. PATENT DOCUMENTS

2014/0246908 A1* 9/2014 Chew .................... H02M 3/156
                                                    307/24
2016/0099582 A1* 4/2016 Ramorini .............. H02J 7/0052
                                                    320/162

OTHER PUBLICATIONS

Saggini, S. et al: "Power Management in Multi-Source Multi-Load Energy Harvesting Systems," Power Electronics and Applications, 2009. EPE '09, 13th European Conference, Sep. 8-10, 2009 (pp. 1-10).

\* cited by examiner

SINGLE INDUCTOR DC-DC CONVERTER WITH REGULATED OUTPUT AND ENERGY HARVESTING SYSTEM

TECHNICAL FIELD

This disclosure relates generally to DC-DC converter circuits, and more particularly to a converter circuit for use in a buck, boost or buck-boost converter within an energy harvesting system.

BACKGROUND

Systems for harvesting energy (also known in the art as "energy scavenging systems") from intermittent environmental energy sources are well known in the art. In a typical configuration, energy generated from a mechanical or thermal source is harvested, rectified, converted, regulated and then delivered to a load, which may include an electronic circuit. With respect to a mechanical source, low frequency vibrations, such as the mechanical vibrations or disturbances associated with moving parts provide an energy source, with the energy converted by a transducer (such as, for example, a piezoelectric or electromagnetic device) into electrical energy.

Figure 1:
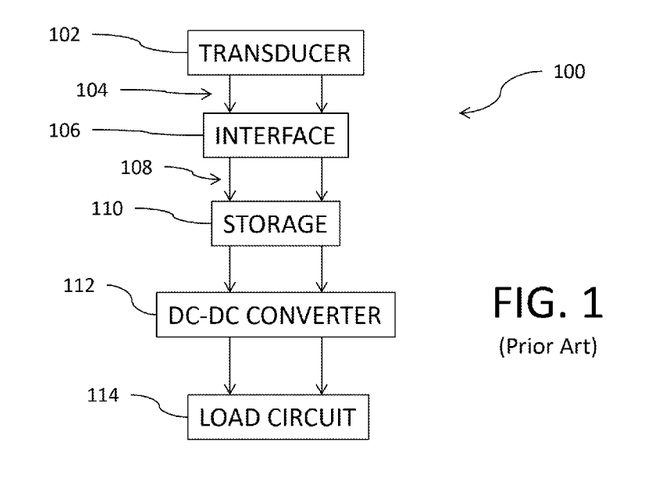
FIG. 1 is a block diagram of a conventional energy harvesting system.

Reference is now made to FIG. 1 showing a block diagram of a conventional energy harvesting system 100. A transducer 102 is configured to convert mechanical or thermal energy into electrical energy at output 104. A scavenging interface 106 is coupled to receive the electrical energy at output 104 and provide converted electrical energy at output 108. In an example implementation, the interface 106 may comprise a rectifier circuit for converting AC electrical energy from output 104 to DC electrical energy at output 108. The DC electrical energy from output 108 is provided to and stored by an energy storage element 110. The element 110 may, for example, comprise a battery device. In another implementation, the element 110 may comprise a capacitor. The DC energy made available at the energy storage element 110 is then converted by a DC-DC converter circuit 112 as a power supply for a load circuit 114.

SUMMARY

In an embodiment, an energy harvesting circuit comprises: an input configured to receive an input voltage from a transducer; a first output configured to be coupled to an energy storage device; a second output configured to be coupled to a load circuit; and a circuit coupled between the input and the first and second outputs, the circuit configured to use a same single inductor element for generating charging current at the first output and generating load current at the second output.

In a charging mode of operation, the circuit generates said charging current from said input voltage in order to store a supply voltage on said energy storage device. In a regulating mode of operation, the circuit generates said load current from said supply voltage in order to provide a regulated output voltage to said load circuit. Switching between the charging mode and the regulating mode is performed in accordance with a discontinuous mode (DCM) process using, for example, hysteretic control or pulse frequency modulation control.

In an embodiment, a method comprises: receiving an input voltage from a transducer; generating a first output coupled to an energy storage device; generating a second output coupled to a load circuit; using a single inductor element in a charging mode to generate charging current at the first output; and using said single inductor element in a regulating mode to generate load current at the second output.

In a charging mode of operation, the method generates the charging current from the input voltage and stores a supply voltage on said energy storage device. In a regulating mode of operation, the method generates the load current from the supply voltage and provides a regulated output voltage to the load circuit. Switching between the charging mode and the regulating mode is performed in accordance with a discontinuous mode (DCM) process using, for example, hysteretic control or pulse frequency modulation control.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF THE DRAWINGS

Figure 2:
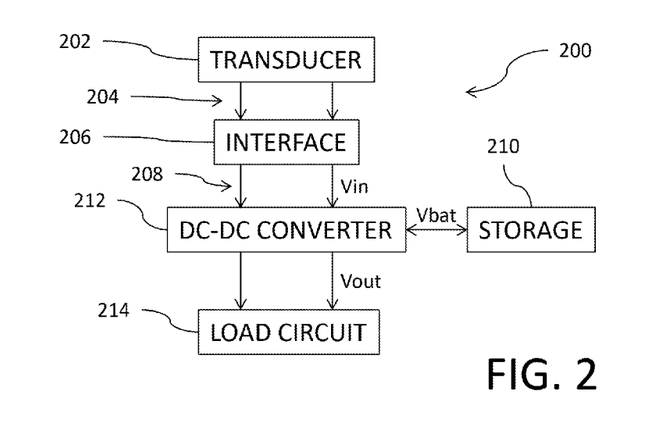
FIG. 2 is a block diagram of an embodiment for an energy harvesting system.

Reference is now made to FIG. 2 showing a block diagram of an embodiment of an energy harvesting system 200. A transducer 202 is configured to convert mechanical or thermal energy (for example) into electrical energy at output 204. A scavenging interface 206 is coupled to receive the electrical energy at output 204 and provide electrical energy at output 208. In an example implementation, the interface 206 may comprise a rectifier circuit for converting AC electrical energy from output 204 to DC electrical energy at output 208. The DC electrical energy from output 208 is provided as an input voltage (Vin) to a DC-DC converter circuit 212 which can provide that energy as a voltage (Vbat) stored by an energy storage element 210. The element 210 may, for example, comprise a battery device. In another implementation, the element 210 may comprise a capacitor. The DC energy from the voltage Vbat is converted by the DC-DC converter circuit 212 as a power supply output voltage (Vout) for a load circuit 214.

Figure 3:
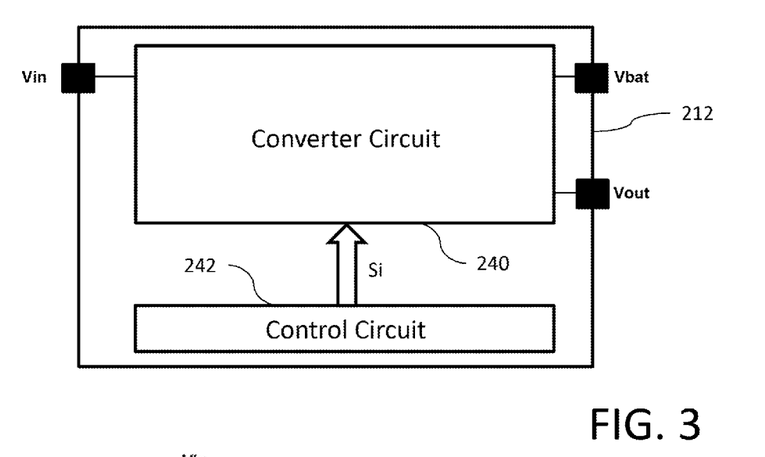
FIG. 3 is a block diagram of the DC-DC converter of FIG. 2.

Reference is now made to FIG. 3 showing a block diagram of the DC-DC converter 212 of FIG. 2. The converter 212 comprises a converter circuit 240 and a control circuit 242. The converter circuit 240 has a buck-boost configuration (described in more detail herein). In one mode of operation, the converter circuit functions to take DC energy from the input voltage Vin to provide that energy as a voltage Vbat (i.e., a supply voltage) stored by an energy storage element 210. This is referred to as a Vbat charging mode. In another mode of operation, the converter circuit functions to take DC energy from the voltage Vbat stored by the energy storage element 210 to provide that energy as a voltage Vout to the load circuit. This is referred to as a Vout charging (or regulating) mode. Operation of the converter circuit 240 in both Vbat charging mode and Vout charging mode is controlled by a control circuit 242 which generates switching signals Si to operate the converter circuit 240 in a number of modes including buck, boost and buck-boost.

Figure 4:
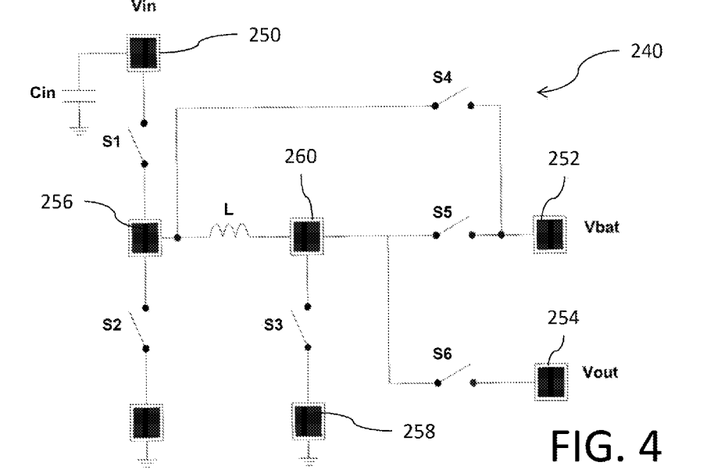
FIG. 4 is a circuit diagram of a converting circuit for the DC-DC converter of FIG. 3.

Reference is now made to FIG. 4 showing a circuit diagram for an embodiment of the converter circuit 240. The circuit 240 includes an input node 250 configured to receive the input voltage Vin, a first output node 252 configured to support the battery voltage Vbat and a second output node 254 configured to generate the output voltage Vout. A first switch S1 is coupled between the input node 250 and a first inductor node 256. A second switch S2 is coupled between the first inductor node 256 and a reference node 258 (for example, ground). An inductor L is coupled between the first inductor node 256 and a second inductor node 260. A third switch S3 is coupled between the second inductor node 260 and the reference node 258. A fourth switch S4 is coupled between the first output node 252 (for Vbat) and the first inductor node 256. A fifth switch S5 is coupled between the first output node 252 (for Vbat) and the second inductor node 260. A sixth switch S6 is coupled between the second output node 254 (for Vout) and the second inductor node 260. A capacitor Cin is provided to store and supply the input voltage Vin, with the capacitor Cin coupled between the input node 250 and the reference node 258.

Figure 5A:
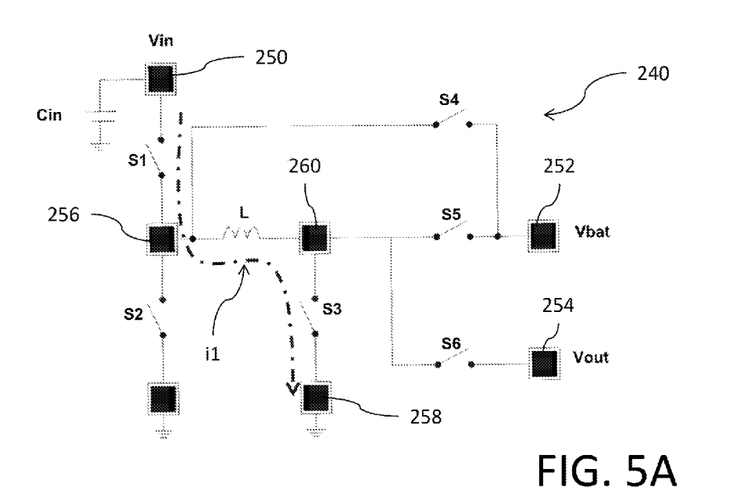
FIGS. 5A and 5B illustrate operation of the converting circuit in association with supporting a Vbat charging mode.
Figure 5B:
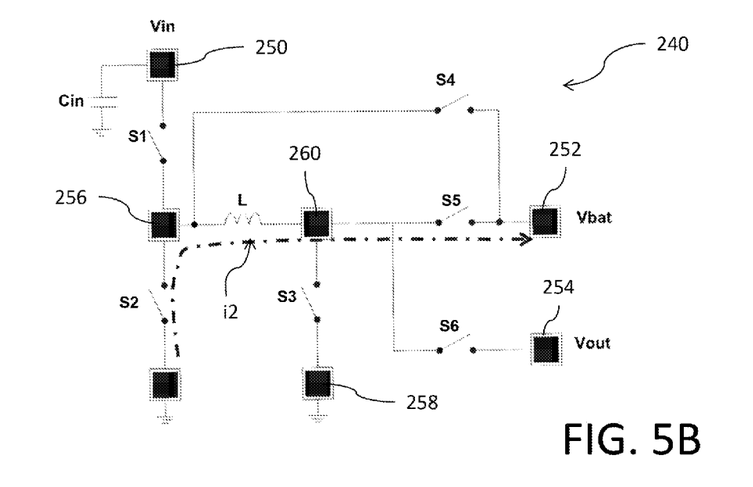

Reference is now made to FIGS. 5A and 5B for a description of the operation of the circuit 240 in association with supporting the Vbat charging mode. In a first phase of operation, as shown in FIG. 5A, the control circuit 242 actuates switches S1 and S3. This connects the inductor L with a first polarity between the input node 250 and the reference node 258. The voltage across the first and second inductor nodes 256 and 260 is constant (Vin), but an increasing current i1 flows through the inductor. In a second phase of operation, as shown in FIG. 5B, the control circuit actuates switches S2 and S5. This connects the inductor L with a second, opposite, polarity between the reference node 258 and the first output node 252 (for Vbat). A voltage across the first and second inductor nodes 256 and 260 is constant (Vbat), and a decreasing current i2 flows through the inductor as charge is dumped into the storage element 210 (FIG. 2). This Vbat charging mode accordingly is used to charge the storage element 210 using a buck-boost operation. While the system is operating in the Vbat charging mode, the first and second phases of operation are repeatedly cycled in order to charge the energy storage element 210.

Figure 6A:
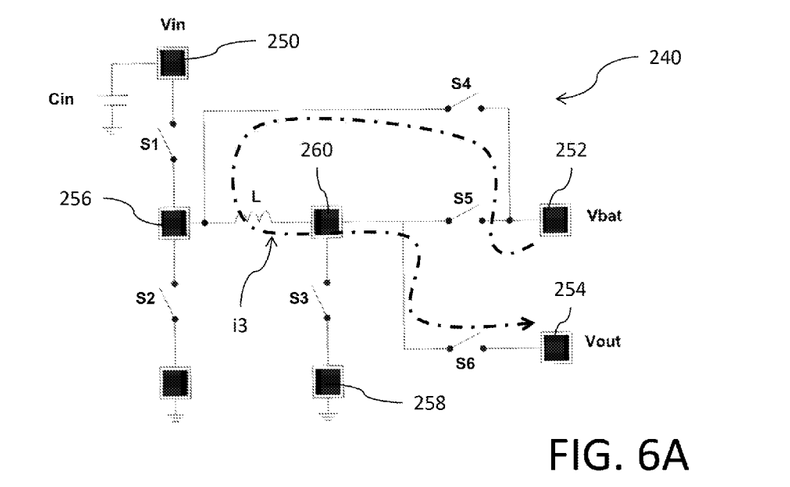
FIGS. 6A and 6B illustrate operation of the converting circuit in association with supporting the Vout charging mode.
Figure 6B:
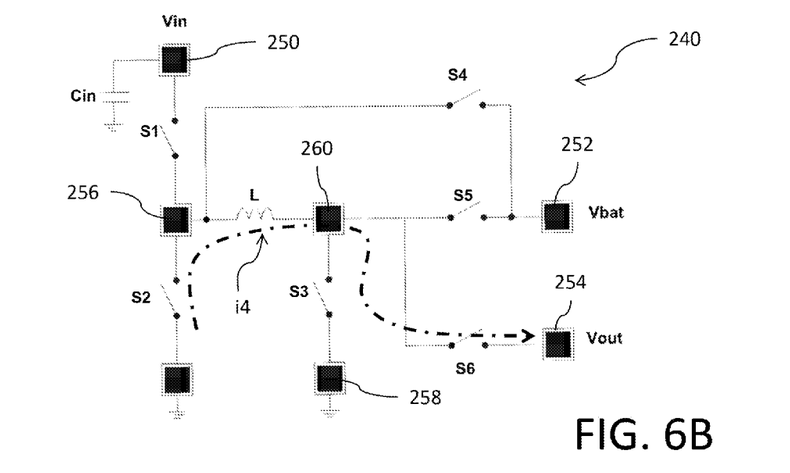

Reference is now made to FIGS. 6A and 6B for a description of the operation of the circuit 240 in association with supporting the Vout charging mode. In a first phase of operation, as shown in FIG. 6A, the control circuit 242 actuates switches S4 and S6. This connects the inductor L with a first polarity between the first output node 252 and the second output node 254 (for Vout). A voltage across the first and second inductor nodes 256 and 260 is constant (Vbat−Vout) and an increasing current i3 flows through the inductor to the second output node 254. In a second phase of operation, as shown in FIG. 6B, the control circuit actuates switches S2 and S6. This connects the inductor L with a second, opposite, polarity between the reference node 258 and the second output node 254. A voltage across the first and second inductor nodes 256 and 260 is constant (Vout), and decreasing current i4 flows through the inductor as charge is dumped into the load circuit 214 (FIG. 2). This Vout charging mode accordingly is used to provide charge to the load circuit 214 using a buck regulation. While the system is in Vout charging mode, the first and second phases of operation are repeatedly cycled in order to supply power to the load circuit 214 from the energy storage element 210.

Figure 7A:
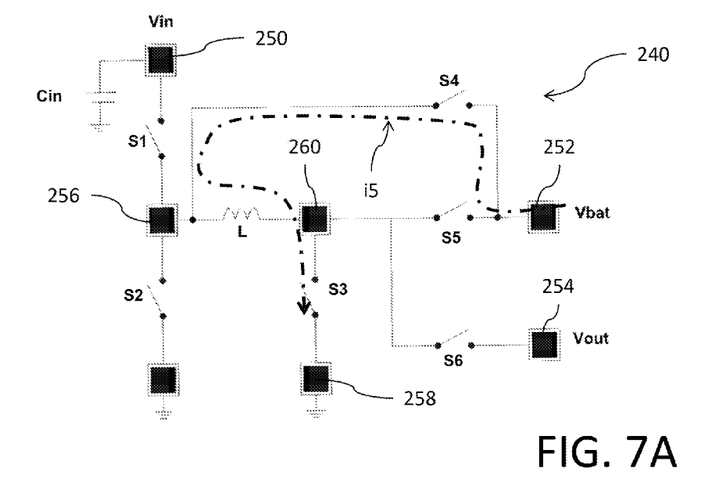
FIGS. 7A and 7B illustrate operation of the converting circuit in association with supporting the Vout charging mode.
Figure 7B:
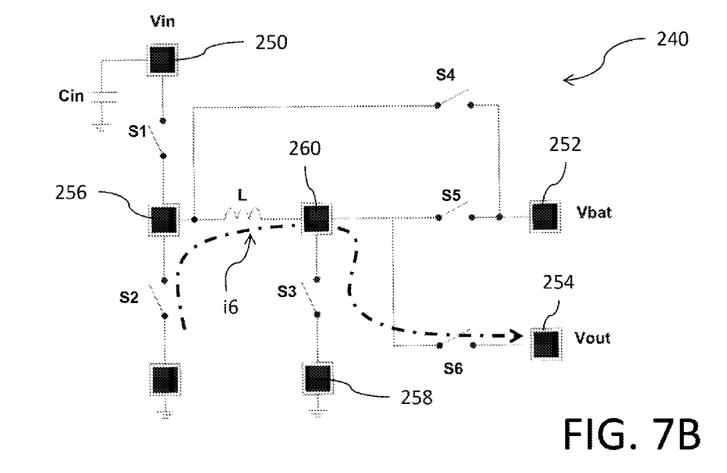

Reference is now made to FIGS. 7A and 7B for a description of the operation of the circuit 240 in association with supporting the Vout charging mode. In a first phase of operation, as shown in FIG. 7A, the control circuit 242 actuates switches S3 and S4. This connects the inductor L with a first polarity between the first output node 252 and the reference node 258. A voltage across the first and second inductor nodes 256 and 260 is constant (Vbat), and an increasing current i5 flows through the inductor. In a second phase of operation, as shown in FIG. 7B, the control circuit actuates switches S2 and S6. This connects the inductor L with a second, opposite, polarity between the reference node 258 and the second output node 254. A voltage across the first and second inductor nodes 256 and 260 is constant (Vout), and a decreasing current i6 flows through the inductor as charge is dumped into the load circuit 214 (FIG. 2). This Vout charging mode accordingly is used to provide charge to the load circuit 214 using a buck-boost regulation. While the system is in Vout charging mode, the first and second phases of operation are repeatedly cycled in order to supply power to the load circuit 214 from the energy storage element 210.

It will accordingly be noted that the circuit 240 allows the switches S1-S6 to be configured in support of both Vbat charging mode and Vout charging (regulating) mode. The Vout charging mode is given a higher priority and the converter circuit 240 operates to enter Vbat charging mode only when the load circuit does not need to be charged (i.e., the voltage at the load is within regulation). The first output node 252 is the output of the converter circuit 240 when the system operates in the Vbat charging mode. However, the first output node 252 is the supply voltage input when the system operates in the Vout charging mode. Configuration of the charging circuit 240 to operate with a buck-boost architecture is required in order to support energizing the inductor L with two polarities in order to source/sink current to/from the first output node 252 (Vbat) in the two operating modes.

In a preferred implementation, the control circuit 242 operates the system including circuit 240 in a discontinuous mode (DCM) in order to ensure that there is no cross-regulation between Vbat and Vout.

An on-off DC-DC control algorithm is implemented by the control circuit 242 in order to support switching between the Vout charging mode and the Vbat charging mode. As examples only, the DC-DC control algorithm may comprise pulse frequency modulation control or hysteretic control for use during the Vout charging mode.

Figure 8A:
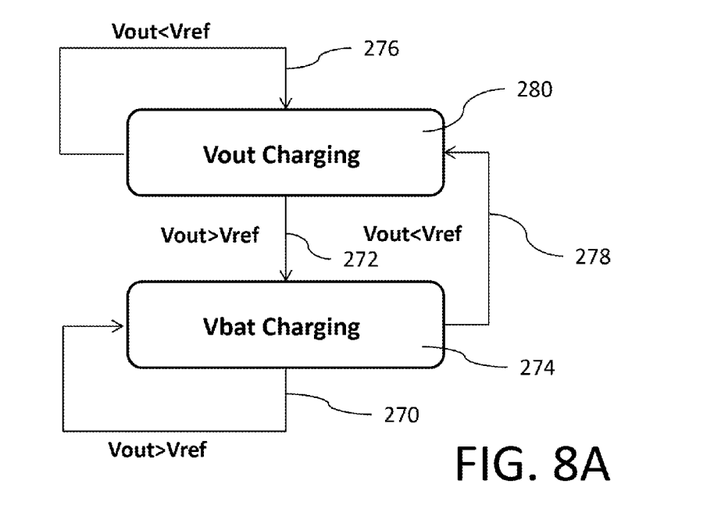
FIGS. 8A and 8B illustrate operation in accordance with a DCM pulse frequency modulation control algorithm.
Figure 8B:
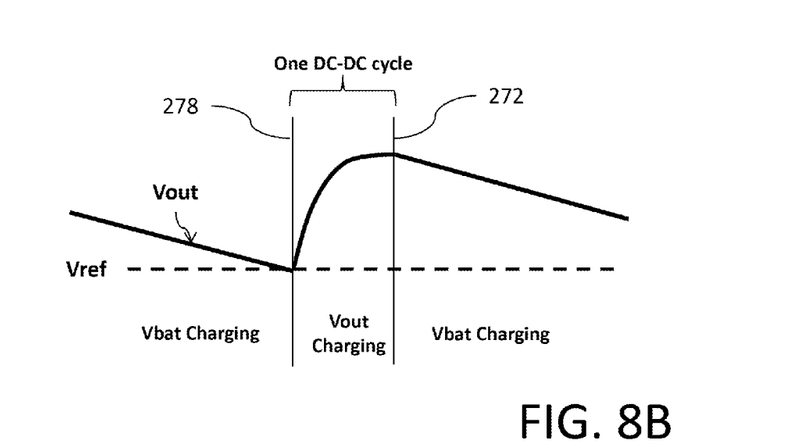

FIG. 8A shows a state diagram for the DCM pulse frequency modulation control algorithm implemented by the control circuit 242. FIG. 8B illustrates the voltage at the second output node 254 (Vout) in accordance with such a DCM pulse frequency modulation control algorithm. The control circuit 242 monitors the voltage Vout at the second output node 254 in comparison to a reference voltage Vref. While the voltage Vout is greater than the reference voltage, the control circuit 242 maintains system operation in (reference 270), or switches the operation to (reference 272), the Vbat charging mode 274. While the voltage Vout is less than the reference voltage, the control circuit 242 maintains system operation in (reference 276), or switches the operation to (reference 278), the Vout charging mode 280. The process then repeats. It will be noted that the switch to Vout charging mode 280 at reference 278 typically lasts for only one DC-DC cycle in pulse frequency modulation because the voltage Vout will rise above the reference voltage Vref by the end of that one DC-DC cycle.

Figure 9A:
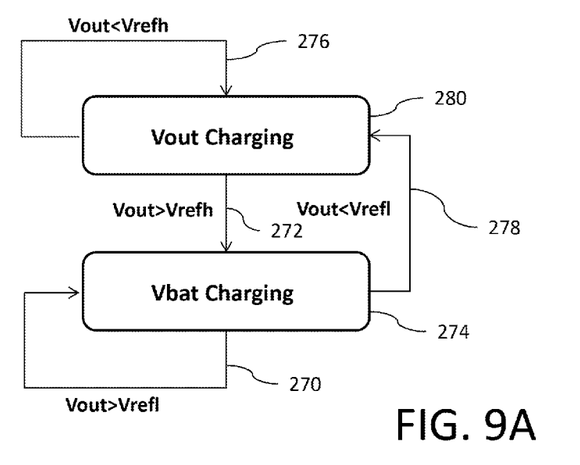
FIGS. 9A and 9B illustrate operation in accordance with a hysteretic control algorithm.
Figure 9B:
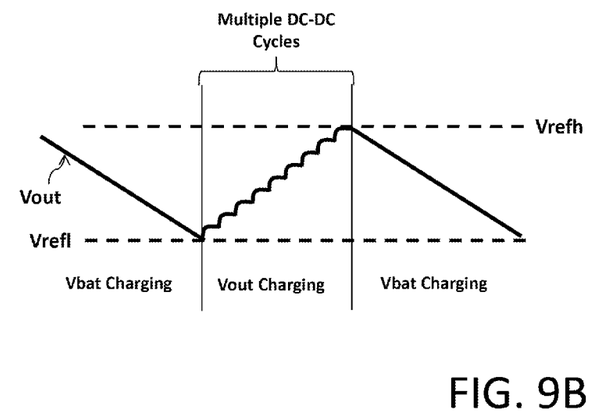

FIG. 9A shows a state diagram for the DCM hysteretic control algorithm implemented by the control circuit 242. FIG. 9B illustrates the voltage at the second output node 254 (Vout) in accordance with such a hysteretic control algorithm. The control circuit 242 monitors the voltage Vout at the second output node 254 in comparison to a high reference voltage Vrefh and a low reference voltage Vrefl. When operating in the Vbat charging mode 274, the voltage Vout will eventually drop below the low reference voltage Vrefl. The control circuit 242 then switches (reference 278) to the Vout charging mode 280 and maintains operation in the Vout charging mode 280 (reference 276) until the voltage Vout rises above the high reference voltage Vrefh. This rise in voltage Vout may take one or more (and perhaps many) DC-DC cycles. When the voltage Vout exceeds the high reference voltage Vrefh, the control circuit 242 then switches (reference 272) to the Vbat charging mode 274 (reference 274) and maintains operation in the Vbat charging mode 274 (reference 270) until the voltage Vout drops below the low reference voltage Vrefl. The process then repeats.

Figure 10:
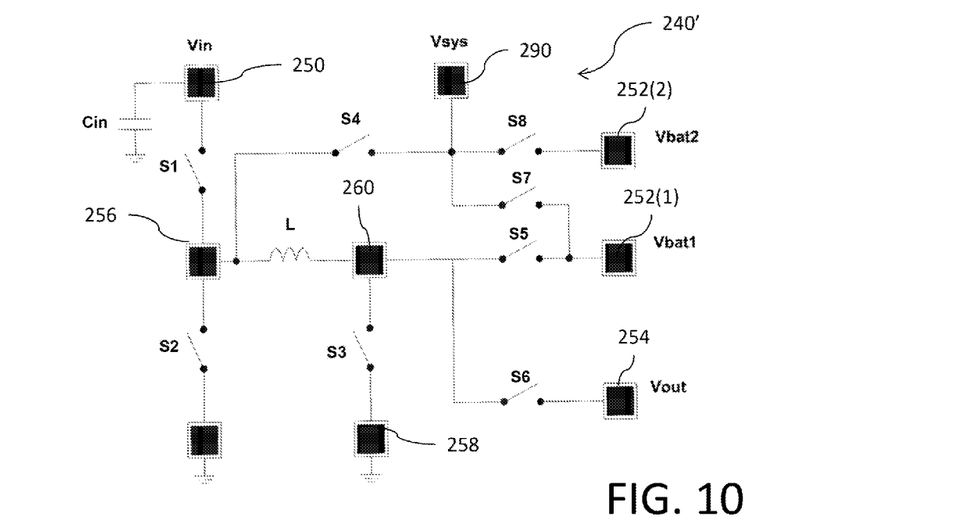
FIG. 10 is a circuit diagram of another embodiment for the converter circuit.

Reference is now made to FIG. 10 showing a circuit diagram of another embodiment for the converter circuit 240'. Like reference numbers in FIG. 4 refer to like or similar components which will not be further discussed. The circuit of FIG. 10 differs from the circuit of FIG. 4 in that the circuit of FIG. 10 is configured to support the use of multiple energy storage elements 210. A first energy storage element is coupled to output node 252(1) (for the voltage Vbat1) and a second energy storage element is coupled to output node 252(2) (for the voltage Vbat2). As discussed above, the energy storage elements may, for example, comprise batteries and/or capacitors. To support selective use of either storage element, the circuit 240' includes a seventh switch S7 coupled between the output node 252(1) and a system supply node (Vsys) 290. The fifth switch S5 is actuated when the system is operating to charge the first energy storage element, and the sixth and seventh switches S6 and S7 (along with switch S4) are actuated by the control circuit 242 when the system is operating to use the first energy storage element to supply power when charging the load circuit at the output node 254. The circuit 240' further includes an eighth switch S8 coupled between the output node 252(2) and the system supply node (Vsys) 290. The sixth and eighth switches S6 and S8 (along with switch S4) are actuated by the control circuit 242 when the system is operating to use the second energy storage element to supply power when charging the load circuit at the output node 254. Thus, the seventh and eighth switches S7 and S8 are separately actuated by the control circuit 242 when providing the stored voltage (Vbat1 or Vbat2) to node Vsys during Vout charging (regulating) mode. When the system is operating in Vout charging mode, the converter circuit is energized from the node Vsys.

The architecture of FIG. 10 permits the recharging only of the Vbat1 storage element. To support recharging of the Vbat2 storage element, an additional switch coupled between node 260 and node 252(2) (at Vbat2) is needed. This switch is not illustrated, but would be similar to switch S5.

It is further noted that the seventh and eighth switches S7 and S8 are not permitted by the control circuit 242 to be simultaneously on. This control ensures that there is no charge sharing between the energy storage elements coupled to the output nodes 252(1) and 252(2).

Figure 11:
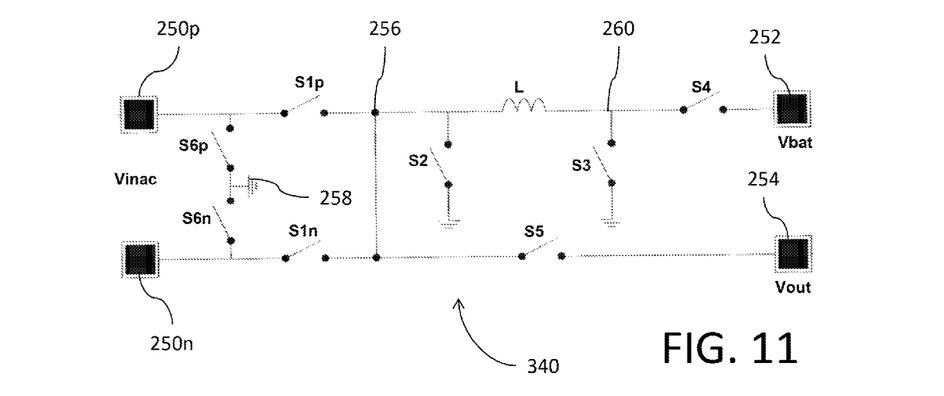
FIG. 11 is a circuit diagram of another embodiment for the converter circuit.

Reference is now made to FIG. 11 showing a circuit diagram for an alternate embodiment of a converter circuit 340 for use in the circuit 212 of FIG. 3 (wherein the circuit 340 can be used as, or in place of, the circuit 240). The circuit 340 includes input nodes 250p and 250n configured to receive a differential AC input voltage Vinac. A first output node 252 is configured to support the battery voltage Vbat and a second output node 254 configured to generate the output voltage Vout. A first set of switches S1p and S1n are coupled between the input nodes 250p and 250n, respectively, and a first inductor node 256. A second switch S2 is coupled between the first inductor node 256 and a reference node 258 (for example, ground). An inductor L is coupled between the first inductor node 256 and a second inductor node 260. A third switch S3 is coupled between the second inductor node 260 and the reference node 258. A fourth switch S4 is coupled between the first output node 252 (for Vbat) and the second inductor node 260. A fifth switch S5 is coupled between the second output node 254 (for Vout) and the first inductor node 256.

The switch S1p supports connection of the positive phase of the differential input voltage Vinac to the node 256, while the switch S1n supports connection of the negative phase of the differential input voltage Vinac to the node 256. The switches S1p and S1n accordingly function as a rectification circuit. A set of switches S6p and S6n are coupled between the input nodes 250p and 250n, respectively, and the reference node 258 to provide the ground path for rectification.

Figure 12A:
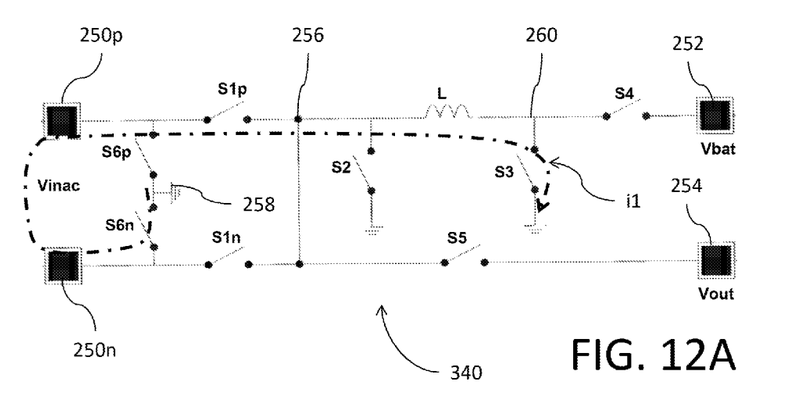
FIGS. 12A and 12B illustrate operation of the converting circuit in association with supporting a Vbat charging mode.
Figure 12B:
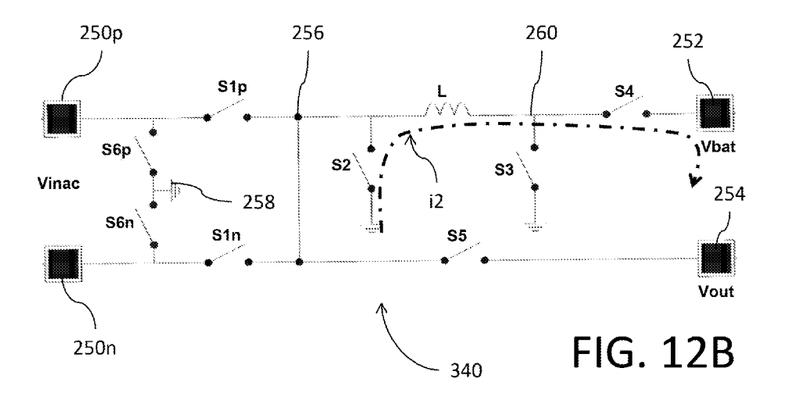

Reference is now made to FIGS. 12A and 12B for a description of the operation of the circuit 340 in association with supporting the Vbat charging mode (and assuming the positive polarity of the differential input voltage Vinac). In a first phase of operation, as shown in FIG. 12A, the control circuit 242 actuates switches S1p, S3 and S6n. This connects the inductor L with a first polarity between the input node 250p and the reference node 258. A voltage across the first and second inductor nodes 256 and 260 is constant (at Vinac) and an increasing current i1 flows through the inductor. In a second phase of operation, as shown in FIG. 12B, the control circuit actuates switches S2 and S4. This connects the inductor L with a second, opposite, polarity between the reference node 258 and the first output node 252 (for Vbat). A voltage across the first and second inductor nodes 256 and 260 is constant (at Vbat) and a decreasing current i2 flows through the inductor as charge is dumped into the storage element 210 (FIG. 2). This Vbat charging mode accordingly is used to charge the storage element 210 using a buck-boost operation. While the system is operating in the Vbat charging mode, the first and second phases of operation are repeatedly cycled in order to charge to the energy storage element 210. The discussion of operation in FIGS. 12A and 12B concerns only the positive phase of the input voltage Vinac. To harvest energy from the negative phase, the switches S1$n$, S3 and S6$p$ are instead actuated in the first phase of operation.

Figure 13A:
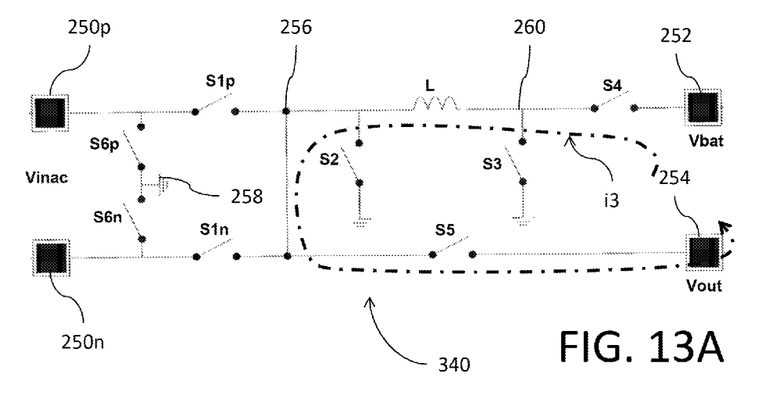
FIGS. 13A and 13B illustrate operation of the converting circuit in association with supporting the Vout charging mode.
Figure 13B:
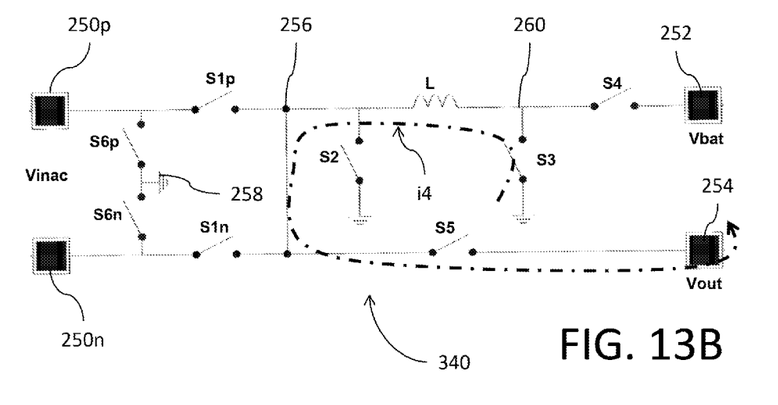

Reference is now made to FIGS. 13A and 13B for a description of the operation of the circuit 340 in association with supporting the Vout charging mode (and assuming the positive polarity of the differential input voltage Vinac). In a first phase of operation, as shown in FIG. 13A, the control circuit 242 actuates switches S4 and S5. This connects the inductor L with a first polarity between the first output node 252 and the second output node 254 (for Vout). A voltage across the first and second inductor nodes 256 and 260 is constant at Vbat−Vout, and an increasing current i3 flows through the inductor to the second output node 254. In a second phase of operation, as shown in FIG. 13B, the control circuit actuates switches S3 and S5. This connects the inductor L with a second, opposite, polarity between the reference node 258 and the second output node 254. A voltage across the first and second inductor nodes 256 and 260 is constant at Vout, and a decreasing current i4 flows through the inductor as charge is dumped into the load circuit 214 (FIG. 2). This Vout charging mode accordingly is used to provide charge to the load circuit 214 using a buck regulation. While the system is in Vout charging mode, the first and second phases of operation are repeatedly cycled in order to supply power to the load circuit 214 from the energy storage element 210.

Figure 14A:
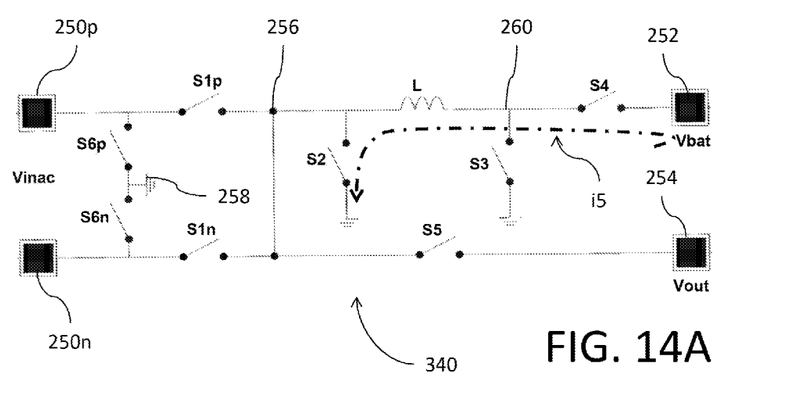
FIGS. 14A and 14B illustrate operation of the converting circuit in association with supporting the Vout charging mode.
Figure 14B:
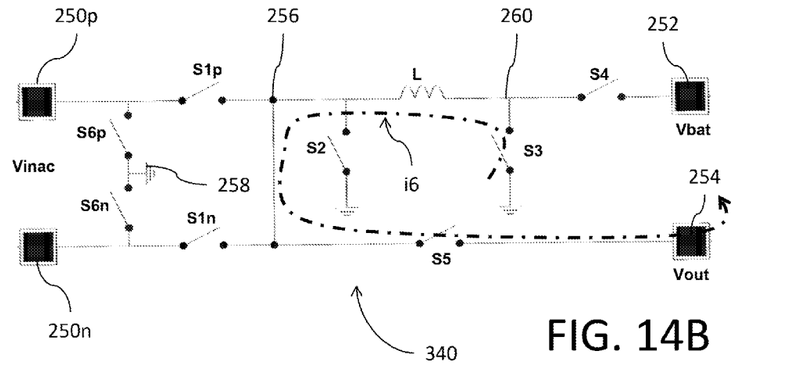

Reference is now made to FIGS. 14A and 14B for a description of the operation of the circuit 240 in association with supporting the Vout charging mode (and assuming the positive polarity of the differential input voltage Vinac). In a first phase of operation, as shown in FIG. 14A, the control circuit 242 actuates switches S2 and S4. This connects the inductor L with a first polarity between the first output node 252 and the reference node 258. A voltage across the first and second inductor nodes 256 and 260 is constant at Vbat, and an increasing current i5 flows through the inductor. In a second phase of operation, as shown in FIG. 14B, the control circuit actuates switches S3 and S5. This connects the inductor L with a second, opposite, polarity between the reference node 258 and the second output node 254. A voltage across the first and second inductor nodes 256 and 260 is constant at Vout, and a decreasing current i6 flows through the inductor as charge is dumped into the load circuit 214 (FIG. 2). This Vout charging mode accordingly is used to provide charge to the load circuit 214 using buck-boost regulation. While the system is in Vout charging mode, the first and second phases of operation are repeatedly cycled in order to supply power to the load circuit 214 from the energy storage element 210.

It will accordingly be noted that the circuit 340 allows the switches S1-S6 to be configured in support of both Vbat charging mode and Vout charging mode. The Vout charging mode is given a higher priority and the converter circuit 340 operates to enter Vbat charging mode only when the load circuit does not need to be charged. The first output node 252 is the output of the converter circuit 340 when the system operates in the Vbat charging mode. However, the first output node 252 is the supply input when the system operates in the Vout charging (regulating) mode. Configuration of the charging circuit 340 to operate with a buck-boost architecture is required in order to support energizing the inductor L with two polarities in order to source/sink current to/from the first output node 252 (Vbat) in the two operating modes.

In a preferred implementation, the control circuit 242 operates the system including circuit 340 in a discontinuous mode (DCM) in order to ensure that there is no cross-regulation between Vbat and Vout.

An on-off DC-DC control algorithm is implemented by the control circuit 242 in order to support switching between the Vout charging mode and the Vbat charging (regulating) mode. As examples only, the DC-DC control algorithm may comprise pulse frequency modulation control or hysteretic control for use during the Vout charging mode. See, discussion above with respect to FIGS. 8A, 8B, 9A and 9B.

Figure 15:
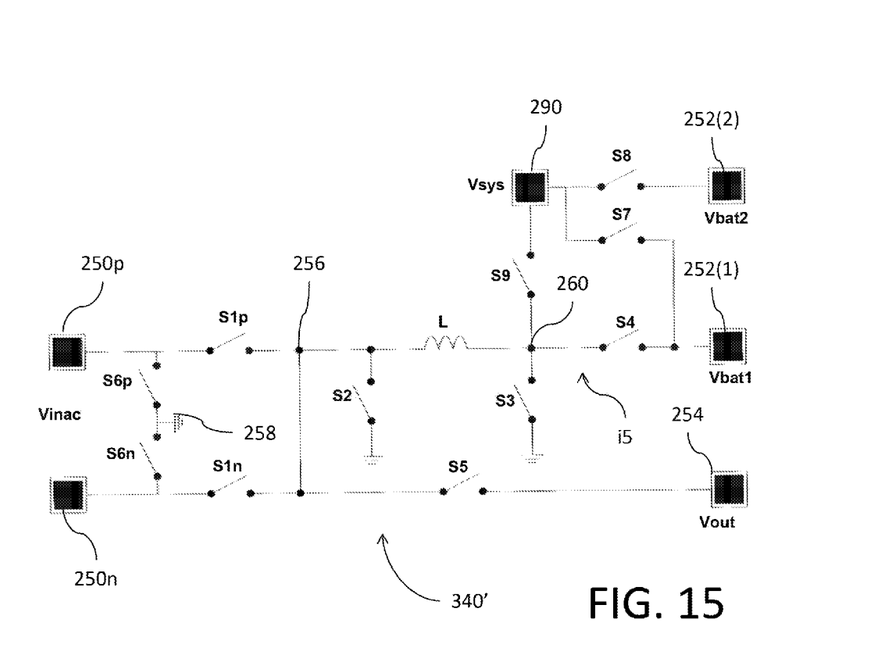
FIG. 15 is a circuit diagram of another embodiment for the converter circuit.

Reference is now made to FIG. 15 showing a circuit diagram of another embodiment for the converter circuit 340'. Like reference numbers in FIG. 11 refer to like or similar components which will not be further discussed. The circuit of FIG. 15 differs from the circuit of FIG. 11 in that the circuit of FIG. 15 is configured to support the use of multiple energy storage elements 210, wherein a first energy storage element is coupled to output node 252(1) (for the voltage Vbat1) and a second energy storage element is coupled to output node 252(2) (for the voltage Vbat2). As discussed above, the energy storage elements may, for example, comprise batteries and/or capacitors. To support selective use of either storage element, the circuit 340' includes a seventh switch S7 coupled between the output node 252(1) and a system supply node (Vsys) 290, an eighth switch S8 coupled between the output node 252(2) and the system supply node (Vsys) 290 and a ninth switch S9 coupled between the system supply node (Vsys) 290 and the second inductor node 260.

The fourth switch S4 is actuated, as discussed above, when the system is operating to charge the first energy storage element. This fourth switch S4 may also be actuated when the system is operating to use the first energy storage element to supply power when charging the load circuit at the output node 254. In an alternative control scheme, the seventh and ninth switches S7 and S9 are actuated by the control circuit 242 when the system is operating to use the first energy storage element to supply power when charging the load circuit at the output node 254.

The circuit 340' further includes an eighth switch S8 coupled between the output node 252(2) and the system supply node (Vsys) 290. The eighth and ninth switches S8 and S9 are actuated when the system is operating to charge the second energy storage element. The eighth and ninth switches S8 and S9 are also actuated by the control circuit 242 when the system is operating to use the second energy storage element to supply power when charging the load circuit at the output node 254. When the system is operating in Vout charging mode, the converter circuit may preferably be energized from the node Vsys using either Vbat1 or Vbat2.

It is noted that the seventh and eighth switches S7 and S8 are not permitted by the control circuit 242 to be simultaneously on. This control ensures that there is no charge sharing between the energy storage elements coupled to the output nodes 252(1) and 252(2).

The converter circuits described herein advantageously share a single inductor L for use in the energy harvesting operation to both charge the energy storage element and generate a regulated output voltage to the load circuit. The DC regulation function supports both current sinking and current sourcing with respect to the energy storage element.

The circuit is preferably implemented as an integrated circuit. In most instances, the inductor L and capacitors of the system are provided as separate passive components. In such a case, the first and second inductor nodes 256 and 260 comprise pins (or pads) of the integrated circuit device. The nodes 250 (including nodes 250(1) and 250(2)), 252 (including nodes 252(1) and 252(2)), 254, 258, 260 and 290 may also comprise pins (or pads) of the integrated circuit device.

The transducer 202 may comprise any one of a number of forms including: a piezoelectric generator, a thermoelectric generator, a mechanical transducer, a solar energy source, and the like.

The switches utilized in the various embodiments may, for example, comprise transistor switches. In one implementation, each switch comprises a MOSFET device that is gate controlled in a manner well known in the art to function as a circuit switch between source and drain terminals.

It will be readily understood by those skilled in the art that materials and methods may be varied while remaining within the scope of the present disclosure. It is also appreciated that the present disclosure provides many applicable inventive concepts other than the specific contexts used to illustrate embodiments. Accordingly, the appended claims are intended to include within their scope such processes, machines, manufacturing, compositions of matter, means, methods, or steps.

What is claimed is:

1. An energy harvesting circuit, comprising:
   an input configured to receive an input voltage from a transducer;
   a first output configured to be coupled to an energy storage device;
   a second output configured to be coupled to a load circuit; and
   a circuit coupled between the input and the first and second outputs, the circuit configured to use a same single inductor element for generating charging current at the first output and generating load current at the second output, wherein said circuit comprises:
   a first switch coupled between said input and a first node configured to be coupled to a first terminal of said single inductor element;
   a second switch coupled between said first node and a reference node;
   a third switch coupled between a second node configured to be coupled to a second terminal of said single inductor element and the reference node;
   a fourth switch coupled between the second node and the first output and
   a fifth switch coupled between the first node and the second output without being coupled to the second node.

2. The energy harvesting circuit of claim 1, wherein said circuit is configured for operation in a charging mode to generate said charging current from said input voltage in order to store a supply voltage on said energy storage device.

3. The energy harvesting circuit of claim 2, wherein said circuit is further configured for operation in a regulating mode to generate said load current from said supply voltage in order to provide a regulated output voltage to said load circuit.

4. The energy harvesting circuit of claim 1, further comprising a control circuit configured to actuate said first through fifth switches for selective connection of the single inductor element in a buck-boost mode to charge said energy storage device at the first output to a supply voltage in response to the input voltage.

5. The energy harvesting circuit of claim 4, wherein said control circuit is further configured to actuate said first through fifth switches for selective connection of the single inductor element in a buck mode to regulate voltage at the second output in response to said supply voltage.

6. The energy harvesting circuit of claim 4, wherein said control circuit is further configured to actuate said first through fifth switches for selective connection of the single inductor element in a buck-boost mode to regulate voltage at the second output in response to said supply voltage.

7. The energy harvesting circuit of claim 1, wherein said first output comprises a first energy storage output and a second energy storage output, further comprising a set of switches configured to selectively couple one or more of the first and second energy storage outputs to said single inductor element.

8. The energy harvesting circuit of claim 1, wherein said circuit further comprises a control circuit configured to selectively actuate said first through fifth switches in both a charging mode and in a regulating mode using said single inductor element.

9. The energy harvesting circuit of claim 8, wherein the control circuit, in the charging mode, operates in a first switching phase to actuate the first and third switches and then operates in a second switching phase to actuate the second and fourth switches.

10. The energy harvesting circuit of claim 9, wherein the control circuit, in the regulating mode, operates in a first switching phase to actuate the fourth and fifth switches and then operates in a second switching phase to actuate the third and fifth switches.

11. The energy harvesting circuit of claim 9, wherein the control circuit, in the regulating mode, operates in a first switching phase to actuate the second and fourth switches and then operates in a second switching phase to actuate the third and fifth switches.

12. The energy harvesting circuit of claim 1, wherein said input comprises a first input and a second input configured to receive an AC input voltage, with said first switch coupled between said first input and the first node and further comprising:
   a sixth switch coupled between said second input and the first node;
   a seventh switch coupled between the first input and the reference node; and
   an eighth switch coupled between the second input and the reference node.

13. The energy harvesting circuit of claim 12, further comprising a control circuit configured to control actuation of the first, sixth, seventh and eighth switches to rectify the AC input voltage and provide a DC input voltage at said first node.

* * * * *